United States Patent
Lin et al.

(10) Patent No.: US 12,198,360 B2
(45) Date of Patent: *Jan. 14, 2025

(54) METHOD FOR DETERMINING GROWTH HEIGHT OF PLANT, ELECTRONIC DEVICE, AND MEDIUM

(71) Applicant: HON HAI PRECISION INDUSTRY CO., LTD., New Taipei (TW)

(72) Inventors: Tzu-Chen Lin, New Taipei (TW); Chih-Te Lu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 508 days.

This patent is subject to a terminal disclaimer.

(21) Appl. No.: 17/571,882

(22) Filed: Jan. 10, 2022

(65) Prior Publication Data

US 2022/0222838 A1    Jul. 14, 2022

(30) Foreign Application Priority Data

Jan. 12, 2021   (CN) .......................... 202110036324.0

(51) Int. Cl.
*G06T 7/50*     (2017.01)
*G02B 7/04*    (2021.01)
(Continued)

(52) U.S. Cl.
CPC .................. *G06T 7/50* (2017.01); *G02B 7/04* (2013.01); *G06T 5/70* (2024.01); *G06T 7/30* (2017.01);
(Continued)

(58) Field of Classification Search
CPC .... G06T 7/50; G06T 7/30; G06T 7/90; G06T 7/70; G06T 5/70; G06T 2207/10024;
(Continued)

(56) References Cited

U.S. PATENT DOCUMENTS

2010/0322477 A1* 12/2010 Schmitt .................. G06V 20/64
  348/222.1
2011/0222737 A1*  9/2011 Biskup ...................... G06T 7/62
  382/110
(Continued)

FOREIGN PATENT DOCUMENTS

CN           111862194 A      10/2020
WO   WO-2013026439 A1 *  2/2013   ........... G06T 7/0012

OTHER PUBLICATIONS

Jin X, Che J, Chen Y. Weed identification using deep learning and image processing in vegetable plantation. IEEE access. Jan. 8, 2021;9:10940-50. (Year: 2021).*

(Continued)

*Primary Examiner* — Oneal R Mistry
*Assistant Examiner* — Duy Tran
(74) *Attorney, Agent, or Firm* — ScienBiziP, P.C.

(57) ABSTRACT

A method for determining a growth height of a plant, an electronic device, and storage medium are provided. The method includes controlling a camera device to capture a plant to be detected, and obtaining a color image and a depth image of the plant to be detected. The color image and the depth image are aligned and an alignment image is obtained. The color image is detected using a pre-trained mobilenet-ssd network, and a detection box including the plant to be detected is obtained. A depth value of each of pixel points in the detection box is determined, and target depth values are obtained. A mean value and a standard deviation of the target depth values are determined, and a height of the plant to be detected is determined. According to the method, accuracy of the height of the plant can be improved.

17 Claims, 3 Drawing Sheets

(51) Int. Cl.
| | |
|---|---|
| *G06K 9/62* | (2022.01) |
| *G06T 5/00* | (2024.01) |
| *G06T 5/70* | (2024.01) |
| *G06T 7/30* | (2017.01) |
| *G06T 7/70* | (2017.01) |
| *G06T 7/90* | (2017.01) |
| *G06V 10/22* | (2022.01) |
| *G06V 10/56* | (2022.01) |
| *G06V 10/82* | (2022.01) |
| *G06V 20/10* | (2022.01) |
| *H04N 5/232* | (2006.01) |
| *H04N 23/60* | (2023.01) |

(52) U.S. Cl.
CPC .................. *G06T 7/70* (2017.01); *G06T 7/90* (2017.01); *G06V 10/225* (2022.01); *G06V 10/56* (2022.01); *G06V 10/82* (2022.01); *G06V 20/188* (2022.01); *H04N 23/60* (2023.01); *G06T 2207/10024* (2013.01); *G06T 2207/20084* (2013.01); *G06T 2207/30188* (2013.01)

(58) Field of Classification Search
CPC ........... G06T 2207/20084; G06T 2207/30188; G06V 10/56; G06V 10/82; G06V 20/188; G06V 10/225; G06N 20/00; G06N 20/10; G06N 20/20; G02B 7/04; G02B 15/14; H04N 23/60; H04N 23/741
See application file for complete search history.

(56) References Cited

U.S. PATENT DOCUMENTS

2020/0008747 A1\* 1/2020 Lupotti .............. A61B 18/1492
2020/0073389 A1\* 3/2020 Flajolet .................. G05D 1/689

OTHER PUBLICATIONS

Xu K, Li H, Cao W, Zhu Y, Chen R, Ni J. Recognition of weeds in wheat fields based on the fusion of RGB images and depth images. IEEE Access. Jun. 12, 2020;8:110362-70. (Year: 2020).\*

\* cited by examiner

METHOD FOR DETERMINING GROWTH HEIGHT OF PLANT, ELECTRONIC DEVICE, AND MEDIUM

FIELD

The present application relates to a technical field of image analysis, and more particularly to a method for determining a growth height of a plant, an electronic device and a medium.

BACKGROUND

To increase yield and quality of plants, it is helpful to determine a better planting method for the plants by analyzing a daily growth of the plants, thereby reducing planting costs. Determining the growth height of the plants accurately is necessary.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below. Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
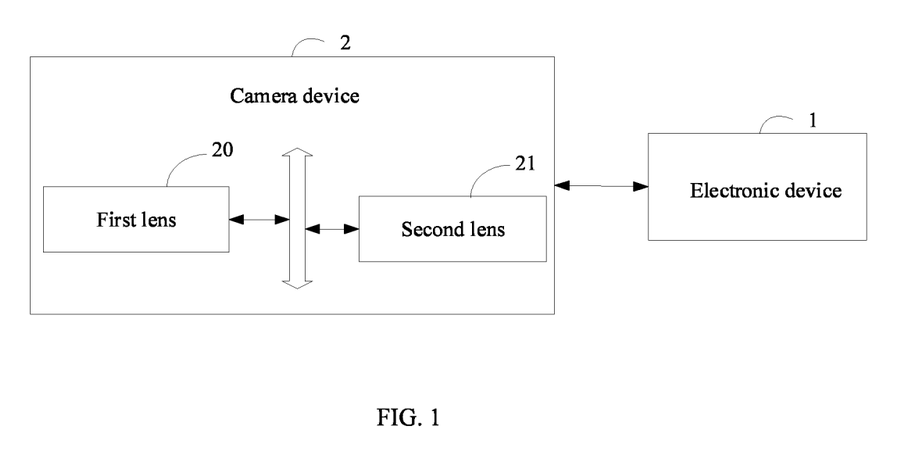
FIG. 1 is a block diagram of a camera device in communication with an electronic device in an embodiment of the present application.

FIG. 1 is a block diagram of a camera device in communication with an electronic device in an embodiment of the present application. As shown in FIG. 1, a camera device 2 communicates with an electronic device 1, and the camera device 2 includes a first lens 20 and a second lens 21. The first lens 20 can capture color images, and the second lens 21 can capture depth images.

Figure 2:
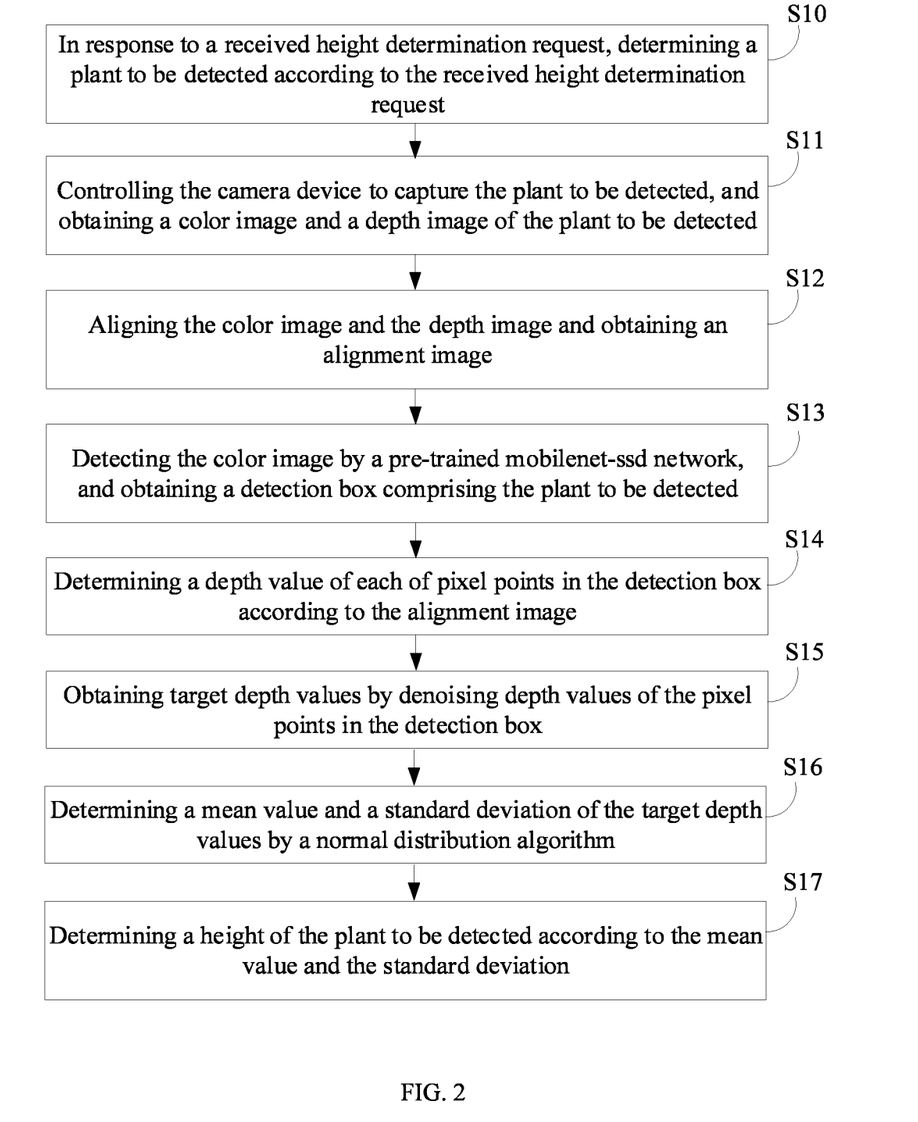
FIG. 2 is a flow chart diagram of a method of determining a growth height of a plant in an embodiment of the present application.

FIG. 2 is a flow chart diagram of the method for determining a growth height of a plant in an embodiment of the present application.

In one embodiment, the method for determining a growth height of a plant can be applied to one or more electronic devices 1. The electronic device 1 includes hardware such as, but not limited to, a microprocessor and an Application Specific Integrated Circuit (ASIC), a Field-Programmable Gate Array (FPGA), a Digital Signal Processor (DSP), embedded devices, for example.

The electronic device 1 may be any electronic product that can interact with a user, such as a personal computer, a tablet computer, a smart phone, a personal digital assistant (Personal Digital Assistant, PDA), a game console, and an interactive network television. (Internet Protocol Television, IPTV), smart wearable devices, for example.

The electronic device 1 may also include a network device and/or a user device. The network device includes, but is not limited to, a single network server, a server group composed of multiple network servers, or a cloud composed of a large number of hosts or network servers based on a cloud computing technology.

A network which includes the electronic device 1 can include, but is not limited to, the Internet, a wide area network, a metropolitan area network, a local area network, and a virtual private network (Virtual Private Network, VPN), for example.

In block S10, in response to a received height determination request, the electronic device 1 determines a plant to be detected according to the received height determination request.

In one embodiment, information carried in the height determination request includes a preset tag, and a plant identification, for example.

Moreover, the plant to be detected may be any plant that needs to be analyzed for daily growth, such as roses, sunflowers, rice plant, for example.

In one embodiment, the electronic device 1 obtains idle threads from a preset thread connection pool, and determines a processing rate of each of the idle threads. The electronic device 1 can determine an idle thread which has the highest processing rate as a target idle thread, and parses a method body of the height determination request with the target idle thread. Information in the height determination request can be obtained. The electronic device 1 further obtains a preset label and extracts information corresponding to the preset label from the information in the height determination request as a plant identifier, and determines the plant to be detected according to the plant identifier.

Based on a mapping relationship between the preset label and the plant identifier, the plant identifier can be accurately obtained, and the plant to be detected can be accurately determined.

In block S11, the electronic device 1 controls the camera device 2 to capture the plant to be detected, and obtains a color image and a depth image of the plant to be detected.

In one embodiment, the color image can be an red, green, blue (RGB) three-channel color image, and the depth image can be an image of which the pixel values indicate a distance from the camera device to each point in a scene to be shot.

In one embodiment, the color image and the depth image of the plant to be detected can be obtained by performing following procedure. A first position being the location of the plant to be detected is determined, and a first lens of the camera device is controlled to move to a second position corresponding to the first position. The first lens is controlled to capture the plant to be detected, and the color image is obtained. Then a second lens of the camera device 2 is controlled to move to the second position, the second lens is controlled to capture the plant to be detected, and the depth image is obtained.

The camera device 2 includes dual lenses, such as the first lens 20 and the second lens 21 as mentioned above. The camera device 2 may be positioned above the plant to be detected.

According to the above embodiments, the color image and the depth image of the plant to be detected can be quickly obtained.

In block S12, the electronic device 1 aligns the color image and the depth image, and obtains an alignment image.

In one embodiment, the alignment image can be an image generated by merging pixels of the color image with pixels of the depth image.

In one embodiment, the electronic device 1 acquires depth pixels of the depth image, and maps the depth pixels to a preset depth coordinate system. Depth coordinates of the depth pixels can be obtained. The electronic device 1 determines world coordinates of the depth pixels according to the depth coordinates and a preset world coordinate system, and determines positions of the depth pixels on the color image according to the world coordinates. The electronic device 1 further determines color pixels corresponding to the positions on the color image, and obtains the alignment image by merging each of the depth pixels with a corresponding one of the color pixels.

The preset depth coordinate system and the preset world coordinate system can be obtained from an open source system, or can be preset by a user according to the actual requirements, not being limited in the application.

According to the above embodiment, the alignment image which includes a depth value can be generated, thereby subsequently determining a growth height of the plant to be detected.

In block S13, the electronic device 1 detects the color image by a pre-trained mobilenet-ssd network, and obtains a detection box including the plant to be detected.

In one embodiment, the detection box is obtained by extracting features of the color image by using convolution kernels in the pre-trained mobilenet-ssd network.

In one embodiment, the electronic device 1 acquires a depth convolution kernel and a point convolution kernel in the mobilenet-ssd network, and extracts features from the color image with the depth convolution kernel. A feature map can be obtained. The electronic device 1 further processes the feature map with the point convolution kernel, and obtains the detection box.

The depth convolution kernel may be a 16*16*128 matrix, and the point convolution kernel may be a 1*1*16 matrix.

Based on the pre-trained mobilenet-ssd network, the detection box can be quickly detected and the detection efficiency can be improved.

In block S14, the electronic device 1 determines a depth value of each of pixel points in the detection box according to the alignment image.

In one embodiment, the depth value indicates a height of the camera device from a feature point on an image of the plant to be detected, the feature point corresponds to the pixel points.

In one embodiment, the electronic device 1 determines a target position of each of the pixel points of the alignment image, and obtains a depth value corresponding to the target position from the alignment image as the depth value of each of the pixel points.

Based on the alignment image, the depth value of each of the pixel points can be accurately and quickly determined.

In block S15, the electronic device 1 obtains target depth values by denoising depth values of the pixel points in the detection box.

In one embodiment, the electronic device 1 determines a depth value as a zero value, the determined depth value being equal to a preset value; and performs a denoising process by deleting the zero value from the depth values of the pixel points. The electronic device 1 further determines remaining depth values as the target depth.

By performing the denoising process on the depth values to obtain the target depth values, it can be ensured that the target depth value does not include interference, thus a growth height of the plant to be detected can be accurately determined.

In block S16, the electronic device 1 determines a mean value and a standard deviation of the target depth values by a normal distribution algorithm.

In one embodiment, the electronic device 1 performs a normal distribution process on the target depth values, obtains a normal distribution curve, and determines the mean value and the standard deviation from the normal distribution curve.

In block S17, the electronic device 1 determines a height of the plant to be detected according to the mean value and the standard deviation.

In one embodiment, the electronic device 1 obtains a first value by adding the mean value and the standard deviation, and obtains a second value by subtracting the standard deviation from the mean value. The electronic device 1 determines a target value by calculating an average value of the first value and the second value, and determines a height of a location where the camera device is located. The electronic device 1 further determines the height of the plant to be detected by subtracting the target value from the height of the camera.

According to the above embodiments, the height of the plant to be detected can be accurately determined.

In one embodiment, in response to the height of the plant to be detected is less than a preset height, warning information is generated according to the height of the plant to be detected. The warning information is encrypted using a symmetric encryption algorithm to obtain a cipher text, an alarm level of the cipher text is determined according to the plant to be detected. Then an alarm mode is determined according to the alarm level of the cipher text, and the cipher text is sent by the alarm mode.

The preset height can be set according to an expected growth rate of the plant to be detected, the above embodiments do not limit the value of the preset height. The alarm level includes: level one, level two, and so on. The alarm mode includes an audio alarm using a loudspeaker, an email mode, a telephone mode, for example.

According to the above embodiment, in response that the height of the plant to be detected is less than the preset height, the warning information can be issued. In addition, the warning information can be protected against tampering by encrypting the warning information, and security of the warning information can be improved. Moreover, the warning information can be sent in an appropriate alarm mode by determining the alarm mode according to the alarm level. Thus, the warning information can be output in a more user-friendly way.

In the above embodiments, the electronic device 1 determines the plant to be detected according to the received height determination request, thereby accurately determining the plant to be detected, whose height needs to be measured. The electronic device 1 controls the camera device to capture images of the plant to be detected and obtains the color image and the depth image of the plant to be detected. It is beneficial to determine the plant to be detected. By denoising the depth values, the target depth values without noise can be obtained, interference caused by imaging defects or damage during the aligning process can be reduced. In addition, by determining the mean value and the standard deviation of the target depth values using the normal distribution algorithm, and determining the height of the plant to be detected based on the mean value and the standard deviation, accuracy of determining the growth height of the plant to be detected can be improved.

Figure 3:
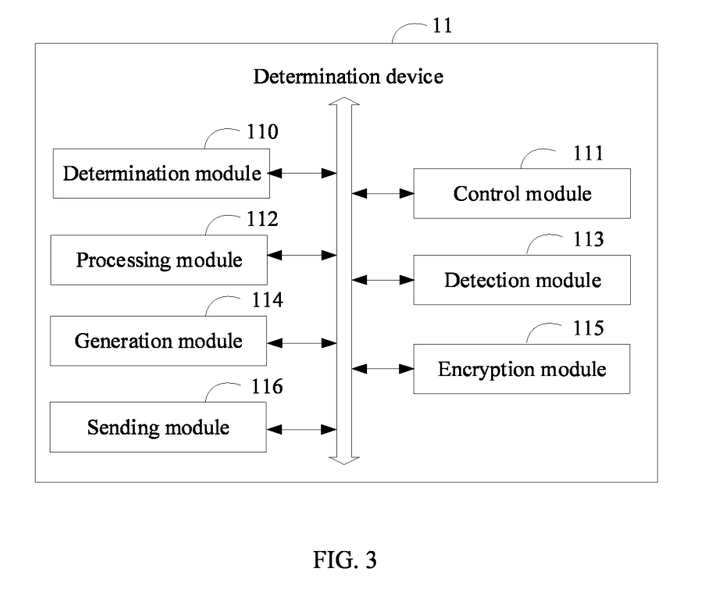
FIG. 3 is a structural diagram of a determination device for determining a growth height of a plant in an embodiment of the present application.

FIG. 3 is a structural diagram of a device for determining a growth height of a plant in an embodiment of the present application.

As shown in FIG. 1, a device 11 for determining a growth height of a plant includes a determination module 110, a control module 111, a processing module 112, a detection module 113, a generation module 114, an encryption module 115, and a sending module 116. The modules as referred to in the present application refer to one of a series of computer-readable instruction segments that can be executed by at least one processor and that are capable of performing fixed functions, which are stored in a storage device. In some embodiments, the functions of each module will be described.

In response to a received height determination request, the determination module 110 determines a plant to be detected according to the received height determination request.

In one embodiment, information carried in the height determination request includes a preset tag, and a plant identification, for example.

Moreover, the plant to be detected may be any plant that needs to be analyzed for daily growth, such as roses, sunflowers, rice plant, for example.

In one embodiment, the determination module 110 obtains idle threads from a preset thread connection pool, and determines a processing rate of each of the idle threads. The determination module 110 can determine an idle thread which has the highest processing rate as a target idle thread, and parses a method body of the height determination request with the target idle thread. Information in the height determination request can be obtained. The determination module 110 further obtains a preset label and extracts information corresponding to the preset label from the information in the height determination request as a plant identifier, and determines the plant to be detected according to the plant identifier.

Based on a mapping relationship between the preset label and the plant identifier, the plant identifier can be accurately obtained, and the plant to be detected can be accurately determined.

The control module 111 controls the camera device 2 to capture the plant to be detected, and obtains a color image and a depth image of the plant to be detected.

In one embodiment, the color image can be an red, green, blue (RGB) three-channel color image, and the depth image can be an image of which the pixel values indicate a distance from the camera device to each point in a scene to be shot.

In one embodiment, the color image and the depth image of the plant to be detected can be obtained by performing following procedure. A first position being the location of the plant to be detected is determined, and a first lens of the camera device is controlled to move to a second position corresponding to the first position. The first lens is controlled to capture the plant to be detected, and the color image is obtained. Then a second lens of the camera device 2 is controlled to move to the second position, the second lens is controlled to capture the plant to be detected, and the depth image is obtained.

The camera device 2 includes dual lenses, such as the first lens 20 and the second lens 21 as mentioned above. The camera device 2 may be positioned above the plant to be detected.

According to the above embodiments, the color image and the depth image of the plant to be detected can be quickly obtained.

The processing module 112 aligns the color image and the depth image, and obtains an alignment image.

In one embodiment, the alignment image can be an image generated by merging pixels of the color image with pixels of the depth image.

In one embodiment, the processing module 112 acquires depth pixels of the depth image, and maps the depth pixels to a preset depth coordinate system. Depth coordinates of the depth pixels can be obtained. The processing module 112 determines world coordinates of the depth pixels according to the depth coordinates and a preset world coordinate system, and determines positions of the depth pixels on the color image according to the world coordinates. The processing module 112 further determines color pixels corresponding to the positions on the color image, and obtains the alignment image by merging each of the depth pixels with a corresponding one of the color pixels.

The preset depth coordinate system and the preset world coordinate system can be obtained from an open source system, or can be preset by a user according to the actual requirements, not being limited in the application.

According to the above embodiments, the alignment image which includes a depth value can be generated, thereby subsequently determining a growth height of the plant to be detected.

The detection module 113 detects the color image by a pre-trained mobilenet-ssd network, and obtains a detection box including the plant to be detected.

In one embodiment, the detection box is obtained by extracting features of the color image by using convolution kernels in the pre-trained mobilenet-ssd network.

In one embodiment, the detection module 113 acquires a depth convolution kernel and a point convolution kernel in the mobilenet-ssd network, and extracts features from the color image with the depth convolution kernel. A feature map can be obtained. The detection module 113 further processes the feature map with the point convolution kernel, and obtains the detection box.

The depth convolution kernel may be a 16*16*128 matrix, and the point convolution kernel may be a 1*1*16 matrix.

Based on the pre-trained mobilenet-ssd network, the detection box can be quickly detected and the detection efficiency can be improved.

The determination module 110 determines a depth value of each of pixel points in the detection box according to the alignment image.

In one embodiment, the depth value indicates a height of the camera device from a feature point on an image of the plant to be detected, the feature point corresponds to the pixel points.

In one embodiment, the determination module 110 determines a target position of each of the pixel points of the alignment image, and obtains a depth value corresponding to the target position from the alignment image as the depth value of each of the pixel points.

Based on the alignment image, the depth value of each of the pixel points can be accurately and quickly determined.

The processing module 112 obtains target depth values by denoising depth values of the pixel points in the detection box.

In one embodiment, the processing module 112 determines a depth value as a zero value, the determined depth value being equal to a preset value; and performs a denoising process by deleting the zero value from the depth values of the pixel points. The processing module 112 further determines remaining depth values as the target depth.

By performing the denoising process on the depth values to obtain the target depth values, it can be ensured that the target depth value does not include interference, thus a growth height of the plant to be detected can be accurately determined.

The determination module 110 determines a mean value and a standard deviation of the target depth values by a normal distribution algorithm.

In one embodiment, the determination module 110 performs a normal distribution process on the target depth values, obtains a normal distribution curve, and determines the mean value and the standard deviation from the normal distribution curve.

The determination module 110 determines a height of the plant to be detected according to the mean value and the standard deviation.

In one embodiment, the determination module 110 obtains a first value by adding the mean value and the standard deviation, and obtains a second value by subtracting the standard deviation from the mean value. The determination module 110 determines a target value by calculating an average value of the first value and the second value, and determines a height of a location where the camera device is located. The determination module 110 further determines the height of the plant to be detected by subtracting the target value from the height of the camera.

According to the above embodiments, the height of the plant to be detected can be accurately determined.

In one embodiment, in response that the height of the plant to be detected is less than a preset height, the generation module 114 generates warning information according to the height of the plant to be detected. The encryption module 115 encrypts the warning information using a symmetric encryption algorithm to obtain a cipher text, an alarm level of the cipher text is determined according to the plant to be detected. Then an alarm mode is determined according to the alarm level of the cipher text, and the sending module 116 sends the cipher text by the alarm mode.

The preset height can be set according to an expected growth rate of the plant to be detected, the above embodiments do not limit the value of the preset height. The alarm level may include level one and level two, for example. The alarm mode includes an audio alarm using a loudspeaker, an email mode, a telephone mode, for example.

According to the above embodiments, in response that the height of the plant to be detected is less than the preset height, the warning information can be issued. In addition, the warning information can be protected against tampering by encrypting the warning information, and security of the warning information can be improved. Moreover, the warning information can be sent in an appropriate alarm mode by determining the alarm mode according to the alarm level. Thus, the warning information can be output in a more user-friendly way.

In the above embodiments, the determination module 110 determines the plant to be detected according to the received height determination request, thereby accurately determining the plant to be detected, whose height needs to be measured. The control module 111 controls the camera device to capture images of the plant to be detected and obtains the color image and the depth image of the plant to be detected. It is beneficial to determine the plant to be detected. By denoising the depth values, the target depth values without noise can be obtained, interference caused by imaging defects or damage during the aligning process can be reduced. In addition, by determining the mean value and the standard deviation of the target depth values using the normal distribution algorithm, and determining the height of the plant to be detected based on the mean value and the standard deviation, accuracy of determining the growth height of the plant to be detected can be improved.

Figure 4:
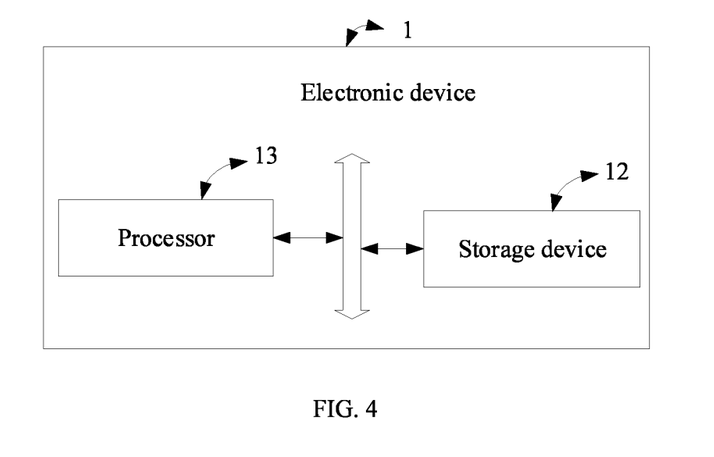
FIG. 4 is a structural diagram of an electronic device housing the determination device in an embodiment of the present application.

FIG. 4 is a structural diagram of an electronic device housing the determination device in an embodiment of the present application. The electronic device 1 may include a storage device 12, at least one processor 13, and computer-readable instructions stored in the storage device 12 and executable on the at least one processor 13, for example, a growth height of a plant determination programs.

Those skilled in the art will understand that FIG. 4 is only an example of the electronic device 1 and does not constitute a limitation on the electronic device 1. Another electronic device 1 may include more or fewer components than shown in the figures or may combine some components or have different components. For example, the electronic device 1 may further include an input/output device, a network access device, a bus, and the like.

The at least one processor 13 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 13 can be a microprocessor or any conventional processor. The processor 13 is a control center of the electronic device 1 and connects various parts of the entire electronic device 1 by using various interfaces and lines.

The processor 13 executes the computer-readable instructions to implement the method for determining a growth height of a plant as mentioned in the above embodiments, such as in block S10-S17 shown in FIG. 2. Alternatively, the processor 13 executes the computer-readable instructions to implement the functions of the modules/units in the foregoing device embodiments, such as the modules 110-116 in FIG. 3.

For example, the computer-readable instructions can be divided into one or more modules/units, and the one or more modules/units are stored in the storage device 12 and executed by the at least one processor 13. The one or more modules/units can be a series of computer-readable instruction segments capable of performing specific functions, and the instruction segments are used to describe execution processes of the computer-readable instructions in the electronic device 1. For example, the computer-readable instruction can be divided into the determination module 110, the control module 111, the processing module 112, the detection module 113, the generation module 114, the encryption module 115, and the sending module 116 as in FIG. 3.

The storage device 12 can be configured to store the computer-readable instructions and/or modules/units. The processor 13 may run or execute the computer-readable instructions and/or modules/units stored in the storage device 12 and may call up data stored in the storage device 12 to implement various functions of the electronic device 1.

The storage device 12 mainly includes a storage program area and a storage data area. The storage program area may store an operating system, and an application program required for at least one function (such as a sound playback function, an image playback function, for example), for example. The storage data area may store data (such as audio data, phone book data, for example) created according to the use of the electronic device 1. In addition, the storage device 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 12 may be an external memory and/or an internal memory of the electronic device 1. The storage device 12 may be a memory in a physical form, such as a memory stick, a Trans-flash Card (TF card), for example.

When the modules/units integrated into the electronic device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

With reference to FIG. 2, the storage device 12 in the electronic device 1 stores a plurality of instructions to implement a method for determining a growth height of a plant, and the processor 13 can execute the multiple instructions to:

in response to a received height determination request, determine a plant to be detected according to the received height determination request;

control the camera device to capture the plant to be detected, and obtain a color image and a depth image of the plant to be detected;

align the color image and the depth image and obtain an alignment image;

detect the color image by a pre-trained mobilenet-ssd network, and obtain a detection box comprising the plant to be detected;

determine a depth value of each of pixel points in the detection box according to the alignment image;

obtain target depth values by denoising depth values of the pixel points in the detection box;

determine a mean value and a standard deviation of the target depth values by a normal distribution algorithm; and determine a height of the plant to be detected according to the mean value and the standard deviation.

The computer-readable instructions are executed by the processor 13 to realize the functions of each module/unit in the above-mentioned device embodiments, which will not be repeated here.

In the several embodiments provided in the preset application, the disclosed electronic device and method can be implemented in other ways. For example, the embodiments of the devices described above are merely illustrative. For example, divisions of the modules are only logical function divisions, and there can be other manners of division in actual implementation.

In addition, each functional module in each embodiment of the present disclosure can be integrated into one processing module, or can be physically present separately in each unit or two or more modules can be integrated into one module. The above modules can be implemented in a form of hardware or in a form of a software functional unit.

Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method of determining a growth height of a plant, implementable by an electronic device connected to a camera device, the method comprising:

in response to a received height determination request, determining a plant to be detected according to the received height determination request;

controlling the camera device to capture the plant to be detected, and obtaining a color image and a depth image of the plant to be detected;

aligning the color image and the depth image and obtaining an alignment image;

detecting the color image by a pre-trained mobilenet-ssd network, and obtaining a detection box comprising the plant to be detected;

determining a depth value of each of pixel points in the detection box according to the alignment image;

obtaining target depth values by denoising depth values of the pixel points in the detection box, comprising: determining a depth value as a zero value, the determined depth value being equal to a preset value; and performing the denoising process by deleting the zero value from the depth values of the pixel points, and determining remaining depth values as the target depth;

determining a mean value and a standard deviation of the target depth values by a normal distribution algorithm; and determining a height of the plant to be detected according to the mean value and the standard deviation.

2. The method for determining a growth height of a plant of claim 1, wherein determining the plant to be detected according to the received height determination request comprises:

obtaining idle threads from a preset thread connection pool;

determining a processing rate of each of the idle threads, and determining an idle thread with the highest processing rate as a target idle thread;

parsing a method body of the height determination request with the target idle thread, and obtaining information in the height determination request;

obtaining a preset label, and extracting information corresponding to the preset label from the information in the height determination request as a plant identifier; and determining the plant to be detected according to the plant identifier.

3. The method for determining a growth height of a plant of claim 1, wherein controlling the camera device to capture the plant to be detected, and obtaining the color image and the depth image of the plant to be detected comprises:

determining a first position where the plant to be detected is located;

controlling a first lens of the camera device move to a second position corresponding to the first position, and controlling the first lens capture the plant to be detected, and obtaining the color image; and controlling a second lens of the camera device move to the second position, and controlling the second lens capture the plant to be detected, and obtaining the depth image.

4. The method for determining a growth height of a plant of claim 1, wherein aligning the color image and the depth image and obtaining the alignment image comprises:

acquiring depth pixels of the depth image;

mapping the depth pixels to a preset depth coordinate system, and obtaining depth coordinates of the depth pixels;

determining world coordinates of the depth pixels according to the depth coordinates and a preset world coordinate system;

determining positions of the depth pixels on the color image according to the world coordinates, and determining color pixels corresponding to the positions on the color image; and obtaining the alignment image by merging each of the depth pixels with corresponding one of the color pixels.

5. The method for determining a growth height of a plant of claim 1, wherein detecting the color image by the pre-trained mobilenet-ssd network, and obtaining the detection box comprising the plant to be detected comprises:

acquiring a depth convolution kernel and a point convolution kernel in the mobilenet-ssd network;

extracting features of the color image with the depth convolution kernel, and obtaining a feature map; and processing the feature map with the point convolution kernel, and obtaining the detection box.

6. The method for determining a growth height of a plant of claim 1, wherein determining the height of the plant to be detected according to the mean value and the standard deviation comprises:

obtaining a first value by adding the mean value and the standard deviation;

obtaining a second value by subtracting the standard deviation from the mean value;

determining a target value by calculating an average value of the first value and the second value;

determining a height of a location where the camera device is located; and determining the height of the plant to be detected by subtracting the target value from the height of the camera.

7. An electronic device comprising:

a processor; and a storage device storing a plurality of instructions, which when executed by the processor, cause the processor to:

in response to a received height determination request, determine a plant to be detected according to the received height determination request;

control the camera device to capture the plant to be detected, and obtain a color image and a depth image of the plant to be detected;

align the color image and the depth image and obtain an alignment image;

detect the color image by a pre-trained mobilenet-ssd network, and obtain a detection box comprising the plant to be detected;

determine a depth value of each of pixel points in the detection box according to the alignment image;

obtain target depth values by denoising depth values of the pixel points in the detection box, comprising: determine a depth value as a zero value, the determined depth value being equal to a preset value; and perform the denoising process by deleting the zero value from the depth values of the pixel points, and determine remaining depth values as the target depth;

determine a mean value and a standard deviation of the target depth values using a normal distribution algorithm; and determine a height of the plant to be detected according to the mean value and the standard deviation.

8. The electronic device of claim 7, wherein the processor is further caused to:

obtain idle threads from a preset thread connection pool;

determine a processing rate of each of the idle threads, and determine an idle thread with the highest processing rate as a target idle thread;

parse a method body of the height determination request with the target idle thread, and obtain information in the height determination request;

obtain a preset label, and extracting the information in the height determination request corresponding to the preset label from all information as a plant identifier; and determine the plant to be detected according to the plant identifier.

9. The electronic device of claim 7, wherein the processor is further caused to:

determine a first position where the plant to be detected is located;

control a first lens of the camera device move to a second position corresponding to the first position, and control the first lens capture the plant to be detected, and obtain the color image; and control a second lens of the camera device move to the second position, and control the second lens capture the plant to be detected, and obtain the depth image.

10. The electronic device of claim 7, wherein the processor is further caused to:
acquire depth pixels of the depth image;
map the depth pixels to a preset depth coordinate system, and obtain depth coordinates of the depth pixels;
determine world coordinates of the depth pixels according to the depth coordinates and a preset world coordinate system;
determine positions of the depth pixels on the color image according to the world coordinates, and determine color pixels corresponding to the positions on the color image; and
obtain the alignment image by merging each of the depth pixels with corresponding one of the color pixels.

11. The electronic device of claim 7, wherein the processor is further caused to:
acquire a depth convolution kernel and a point convolution kernel in the mobilenet-ssd network;
extract features of the color image with the depth convolution kernel, and obtain a feature map; and
process the feature map with the point convolution kernel, and obtain the detection box.

12. The electronic device of claim 7, wherein the processor is further caused to:
obtain a first value by adding the mean value and the standard deviation;
obtain a second value by subtracting the standard deviation from the mean value;
determine a target value by calculating an average value of the first value and the second value;
determine a height of a location where the camera device is located; and
determine the height of the plant to be detected by subtracting the target value from the height of the camera.

13. A non-transitory storage medium having stored thereon at least one computer-readable instructions that, when executed by a processor of an electronic device, causes the processor to perform a method for determining a growth height of a plant, the method comprising:
in response to a received height determination request, determining a plant to be detected according to the received height determination request;
controlling the camera device to capture the plant to be detected, and obtaining a color image and a depth image of the plant to be detected;
aligning the color image and the depth image and obtaining an alignment image;
detecting the color image by a pre-trained mobilenet-ssd network, and obtaining a detection box comprising the plant to be detected;
determining a depth value of each of pixel points in the detection box according to the alignment image;
obtaining target depth values by denoising depth values of the pixel points in the detection box, comprising:
determining a depth value as a zero value, the determined depth value being equal to a preset value; and
performing the denoising process by deleting the zero value from the depth values of the pixel points, and determining remaining depth values as the target depth;
determining a mean value and a standard deviation of the target depth values using a normal distribution algorithm; and
determining a height of the plant to be detected according to the mean value and the standard deviation.

14. The non-transitory storage medium of claim 13, wherein determining the plant to be detected according to the received height determination request comprises:
obtaining idle threads from a preset thread connection pool;
determining a processing rate of each of the idle threads, and determining an idle thread with the highest processing rate as a target idle thread;
parsing a method body of the height determination request with the target idle thread, and obtaining information in the height determination request;
obtaining a preset label, and extracting information corresponding to the preset label from the information in the height determination request as a plant identifier; and
determining the plant to be detected according to the plant identifier.

15. The non-transitory storage medium of claim 13, wherein controlling the camera device to capture the plant to be detected, and obtaining the color image and the depth image of the plant to be detected comprises:
determining a first position where the plant to be detected is located;
controlling a first lens of the camera device move to a second position corresponding to the first position, and controlling the first lens capture the plant to be detected, and obtaining the color image; and
controlling a second lens of the camera device move to the second position, and controlling the second lens capture the plant to be detected, and obtaining the depth image.

16. The non-transitory storage medium of claim 13, wherein aligning the color image and the depth image and obtaining the alignment image comprises:
acquiring depth pixels of the depth image;
mapping the depth pixels to a preset depth coordinate system, and obtaining depth coordinates of the depth pixels;
determining world coordinates of the depth pixels according to the depth coordinates and a preset world coordinate system;
determining positions of the depth pixels on the color image according to the world coordinates, and determining color pixels corresponding to the positions on the color image; and
obtaining the alignment image by merging each of the depth pixels with corresponding one of the color pixels.

17. The non-transitory storage medium of claim 13, wherein detecting the color image by the pre-trained mobilenet-ssd network, and obtaining the detection box comprising the plant to be detected comprises:
acquiring a depth convolution kernel and a point convolution kernel in the mobilenet-ssd network;
extracting features of the color image with the depth convolution kernel, and obtaining a feature map; and
processing the feature map with the point convolution kernel, and obtaining the detection box.

* * * * *